(12) United States Patent
Zhou et al.

(10) Patent No.: US 11,066,088 B2
(45) Date of Patent: Jul. 20, 2021

(54) DETECTION AND POSITIONING METHOD FOR TRAIN WATER INJECTION PORT

(71) Applicant: XIDIAN UNIVERSITY, Xi'an (CN)

(72) Inventors: Huixin Zhou, Xi'an (CN); Pei Xiang, Xi'an (CN); Baokai Deng, Xi'an (CN); Yue Yu, Xi'an (CN); Lixin Guo, Xi'an (CN); Dong Zhao, Xi'an (CN); Hanlin Qin, Xi'an (CN); Bingjian Wang, Xi'an (CN); Jiangluqi Song, Xi'an (CN); Huan Li, Xi'an (CN); Bo Yao, Xi'an (CN); Rui Lai, Xi'an (CN); Xiuping Jia, Xi'an (CN); Jun Zhou, Xi'an (CN)

(73) Assignee: XIDIAN UNIVERSITY, Xi'an (CN)

( * ) Notice: Subject to any disclaimer, the term of this patent is extended or adjusted under 35 U.S.C. 154(b) by 0 days.

(21) Appl. No.: 17/270,873

(22) PCT Filed: Dec. 13, 2018

(86) PCT No.: PCT/CN2018/120895
§ 371 (c)(1),
(2) Date: Feb. 24, 2021

(87) PCT Pub. No.: WO2020/118621
PCT Pub. Date: Jun. 18, 2020

(65) Prior Publication Data
US 2021/0179154 A1 Jun. 17, 2021

(51) Int. Cl.
*B61L 15/00* (2006.01)
*B61L 27/00* (2006.01)
*G06T 7/136* (2017.01)
*G06T 7/11* (2017.01)
(Continued)

(52) U.S. Cl.
CPC .......... *B61L 27/0094* (2013.01); *B61C 17/02* (2013.01); *B61K 11/00* (2013.01);
(Continued)

(58) Field of Classification Search
CPC .. B61L 27/0094; B61L 2201/00; G06T 7/136; G06T 7/74; G06T 7/11;
(Continued)

(56) References Cited

U.S. PATENT DOCUMENTS 6,176,279 B1 * 1/2001 Dahlin ................... B61K 11/00
137/234.6
7,822,275 B2 * 10/2010 Rasheed ................ G06T 7/215
382/173
(Continued)

FOREIGN PATENT DOCUMENTS

CN 203294097 U 11/2013
CN 204406224 U 6/2015
(Continued)

*Primary Examiner* — Gregory M Desire
(74) *Attorney, Agent, or Firm* — Bayramoglu Law Offices LLC

(57) ABSTRACT

A detection and positioning method for a train water injection port includes: acquiring train water injection port video images, and performing threshold segmentation on the train water injection port video images to obtain binarized train water injection port video images; processing the binarized train water injection port video images and matching the processed binarized train water injection port video images with a train water injection port template image; detecting a position of the water injection port in the train water injection port video image and comparing the position with a pre-set position range where the water injection port is located; and if the position and the pre-set position range have been matched, then transmitting a matching valid signal to a mechanical device control module to control a mechanical device to move or stop and start or stop water injection.

18 Claims, 3 Drawing Sheets

(51) Int. Cl.
    *G06T 7/73*         (2017.01)
    *G06K 9/62*         (2006.01)
    *B61K 11/00*       (2006.01)
    *B61C 17/02*       (2006.01)
    *H04N 5/235*       (2006.01)

(52) U.S. Cl.
    CPC .............. *G06K 9/6202* (2013.01); *G06T 7/11* (2017.01); *G06T 7/136* (2017.01); *G06T 7/74* (2017.01); *B61L 2201/00* (2013.01); *G06T 2207/10016* (2013.01); *H04N 5/2351* (2013.01); *H04N 5/2354* (2013.01)

(58) Field of Classification Search
    CPC .......... G06T 2207/10016; B61C 17/02; B61K 11/00; G06K 9/6202; H04N 5/2351; H04N 5/2354
    See application file for complete search history.

(56) References Cited

U.S. PATENT DOCUMENTS

| | | | |
|---|---|---|---|
| 10,500,696 B2 * | 12/2019 | Matsui | B24B 41/06 |
| 2014/0052316 A1 | 2/2014 | Frazier et al. | |
| 2019/0171210 A1 * | 6/2019 | Passot | G05D 1/0272 |

FOREIGN PATENT DOCUMENTS

| | | |
|---|---|---|
| CN | 105844656 A | 8/2016 |
| CN | 106683119 A | 5/2017 |
| CN | 206885072 U | 1/2018 |
| CN | 109709843 A | 5/2019 |
| DE | 102013202756 A1 | 8/2014 |
| DE | 102015205825 A1 | 10/2016 |

* cited by examiner

DETECTION AND POSITIONING METHOD FOR TRAIN WATER INJECTION PORT

CROSS REFERENCE TO THE RELATED APPLICATIONS

This application is the national phase entry of International Application No. PCT/CN2018/120895, filed on Dec. 13, 2018.

TECHNICAL FIELD

The present invention belongs to the technical field of train water injection port detection, and more particularly, relates to a detection and positioning method for a train water injection port.

BACKGROUND

At present, China's railways are developing rapidly, and China also leads the world in high-speed railway technology. However, ordinary trains still dominate China's railway transportation. In order to satisfy the water demand and consumption associated with train passengers and others, water in the train water tank must be continuously replenished. At present, the work of adding water to the train water tank in China is performed manually. The train stops at a station for a short time, and water is added to each carriage at the same time. In this regard, it is inefficient to rely on railway workers to travel between the train water injection port and a well. Because of the train's demand for water, railway workers must work 24 hours a day regardless of the weather conditions, which negatively affects the health of the railway workers. Manual water injection not only requires substantial labor costs, but also has low efficiency. Therefore, it is highly desirable to develop a novel automatic water supply device for trains. Currently, existing water supply devices for trains are typically mechanical devices that cooperate with railway workers to connect the water injection guns with the train water injection ports. Due to the limitations of the surrounding environment of the train at the stop and other factors, the existing train water supply devices must rely on manual coordination to perform water supply automatically.

SUMMARY

Technical Problem

In view of the above-mentioned issues, the main objective of the present invention is to provide a detection and positioning method for a train water injection port.

Technical Solution to the Problems

In order to achieve the above-mentioned objective, the present invention is implemented by the following technical solutions.

An embodiment of the present invention provides a detection and positioning method for a train water injection port. The method includes: acquiring continuous train water injection port video images, and performing threshold segmentation on the train water injection port video images to obtain binarized train water injection port video images; processing the binarized train water injection port video images and matching the processed binarized train water injection port video images with a train water injection port template image; detecting a position of the water injection port in the train water injection port video image and comparing the position with a pre-set position range where the water injection port is located; and if the position and the pre-set position range have been matched, then transmitting a matching valid signal to a mechanical device control module to control a mechanical device to move or stop and start or stop water injection.

In the above solution, the step of performing the threshold segmentation on the train water injection port video images to obtain the binarized train water injection port video images specifically includes: performing binarization segmentation on the train water injection port video images according to a binarization threshold, and sequentially generating an m×n video image window pixel by pixel according to a step of 1 by using the binarized video images.

In the above solution, in a position of the video image window, a position of a pixel in a first row and a first column in the entire frame image in the video image window is marked as coordinates $P(i,j)$ of the position of the video image window.

In the above solution, a process of obtaining the binarization threshold specifically includes: counting the number of pixels corresponding to each grayscale value in a current frame image in the train water injection port video images to form an abstract grayscale histogram, and calculating a binarization threshold with an optimal segmentation effect according to the abstract grayscale histogram.

In the above solution, the method further includes: determining a maximum value M1 and a corresponding grayscale value G1 in the abstract grayscale histogram, determining a secondary peak value M2 on the right side of the grayscale value G1 and a corresponding grayscale value G2 in the abstract grayscale histogram, calculating the histogram between the G1 and the G2 to obtain a minimum valley value M3 and a corresponding grayscale value G3, and defining the G3 as the binarization threshold.

In the above solution, the step of comparing the position with the pre-set position range where the water injection port is located, and if the position and the pre-set position range have been matched, then transmitting the matching valid signal to the mechanical device control module to control the mechanical device to move or stop and start or stop water injection specifically includes: comparing the generated video image window with the train water injection port template image, calculating the total number of pixels with the same pixel value in the same position of the video image window and the train water injection port template image, recording the total number as a window matching result, performing matching degree verification on the window matching result and performing window matching position verification on the window matching result in combination with the position $P(i,j)$ of the video image window to obtain the matching valid signal, and transmitting the matching valid signal to the mechanical device control module.

In the above solution, the step of comparing the generated video image window with the train water injection port template image, calculating the total number of pixels with the same pixel value in the same position of the video image window and the train water injection port template image, and recording the total number as the window matching result specifically includes: sequentially storing m rows in the binarized video image into m first-in-first-out (FIFOs); shifting data read from the m FIFOs to the left as shift bits to corresponding m n-bit shift registers; performing a bitwise XNOR on the read m n-bit shift registers and m n-bit template registers; adding up XNOR results of each row;

counting the number of pixels with the same pixel value in each corresponding n-bit register to obtain n row matching results; summing up the row matching results of the corresponding m n-bit registers to count the number of pixels with the same pixel value in the same position of the video image window and the train injection port template image as the window matching result.

In the above solution, the method further includes: verifying the window matching result, and comparing the window matching result with a set matching threshold: if the window matching result is greater than the matching threshold, then performing pixel number matching, and then performing position matching; and if the window matching result is less than the matching threshold, then waiting for the arrival of a next clock window matching result and continuing to perform the pixel number matching.

In the above solution, the method further includes: performing position verification on the video image window successful in the pixel number matching, and comparing the position matching result P(i,j) with a set window position range: if P(i,j) is within the set window position range, then determining the position matching as successful, and transmitting the matching valid signal to the mechanical device control module; and if P(i,j) is not within the set window position range, then waiting for next verification.

In the above solution, the method further includes: measuring light intensity in a surrounding environment in real time, and when the measured ambient illuminance is lower than a set illuminance threshold, controlling an external lighting lamp to be turned on and off.

Advantages

Compared with the prior art, the present invention achieves automatic detection and identification of the train water injection port, so that a stopped train can be detected in real time 24 hours a day, which saves substantial labor costs and improves efficiency.

DETAILED DESCRIPTION OF THE EMBODIMENTS

In order to make the objectives, technical solutions and advantages of the present invention clearer, the present invention will be further described in detail below with reference to the drawings and embodiments. It should be understood that the specific embodiments described herein are only used to explain the present invention rather than to limit the present invention.

An embodiment of the present invention provides a detection and positioning method for a train water injection port. The method includes: acquiring continuous train water injection port video images, and performing threshold segmentation on the train water injection port video images to obtain binarized train water injection port video images; processing the binarized train water injection port video images, and matching the processed binarized train water injection port video images with a train water injection port template image; detecting and comparing the position of the water injection port in the train water injection port video image with a pre-set position range where the water injection port is located; and if the position and the pre-set position range have been matched, then a matching valid signal is transmitted to a mechanical device control module to control the mechanical device to move or stop and start or stop water injection.

The step of performing the threshold segmentation on the train water injection port video images to obtain the binarized train water injection port video images specifically includes: performing binarization segmentation on the train water injection port video images according to a binarization threshold, and sequentially generating an m×n video image window pixel by pixel according to a step of 1 by using the binarized video images.

In the position of the video image window, the position of a pixel in the first row and the first column in the entire frame image in the video image window is marked as coordinates P(i,j) of the position of the video image window.

A process of obtaining the binarization threshold specifically includes: counting the number of pixels corresponding to each grayscale value in a current frame image in the train water injection port video images to form an abstract grayscale histogram, and calculating a binarization threshold with an optimal segmentation effect according to the abstract grayscale histogram.

The maximum value M1 and the corresponding grayscale value G1 in the abstract grayscale histogram are determined. The secondary peak value M2 on the right side of the grayscale value G1 and the corresponding grayscale value G2 in the abstract grayscale histogram are determined. The histogram between the G1 and the G2 is calculated to obtain the minimum valley value M3 and the corresponding grayscale value G3, and the G3 is defined as the binarization threshold.

Figure 1:
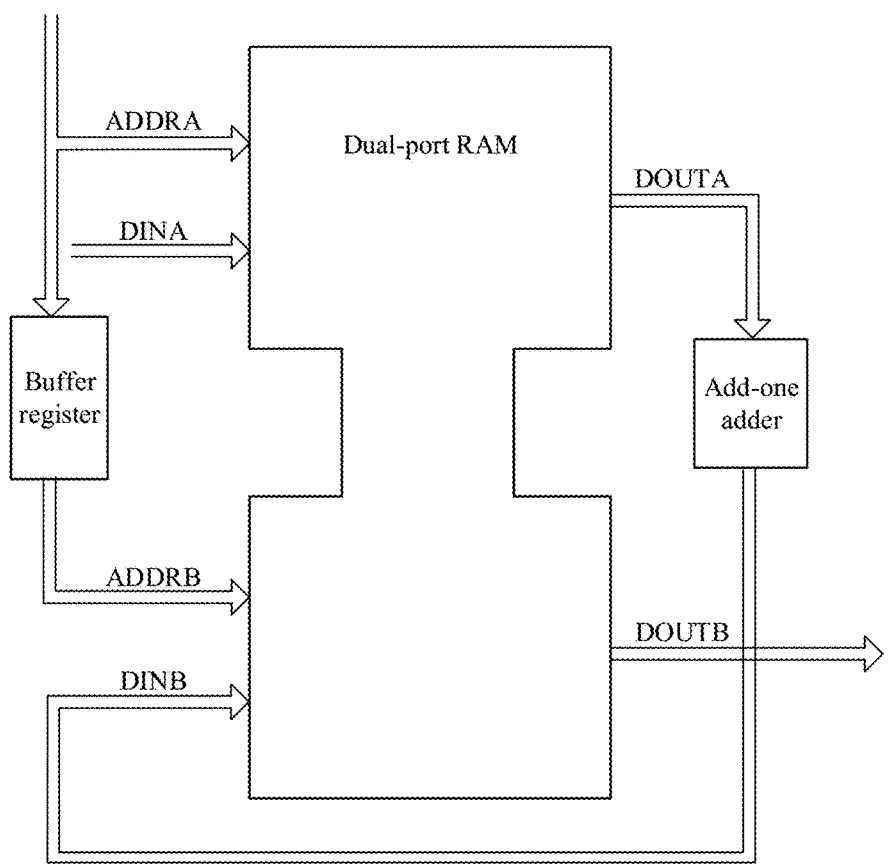
FIG. 1 is a schematic diagram of pixel counting in a detection and positioning method for a train water injection port according to an embodiment of the present invention.

Specifically, as shown in FIG. 1, according to the present invention, the acquired continuous train water injection port video images have a resolution of 640×480. Therefore, the bit width of a dual-port random-access memory (RAM) is set to 16. Both ports of the dual-port RAM support reading and writing. A grayscale value of a currently arrived video image pixel is used as an address of port A of the dual-port RAM, and the stored data is read from port A of the dual-port RAM to an add-one adder. Meanwhile, the arrived video image pixel is delayed by a clock cycle through a buffer register to port B of the dual-port RAM and used as an address of port B of the dual-port RAM, and the data calculated by the add-one adder is stored in the dual-port RAM through port B. When the counting for a frame of image is completed, during a frame blanking period, the address of port B of the dual-port RAM is controlled to read pixel counting results.

Figure 2:
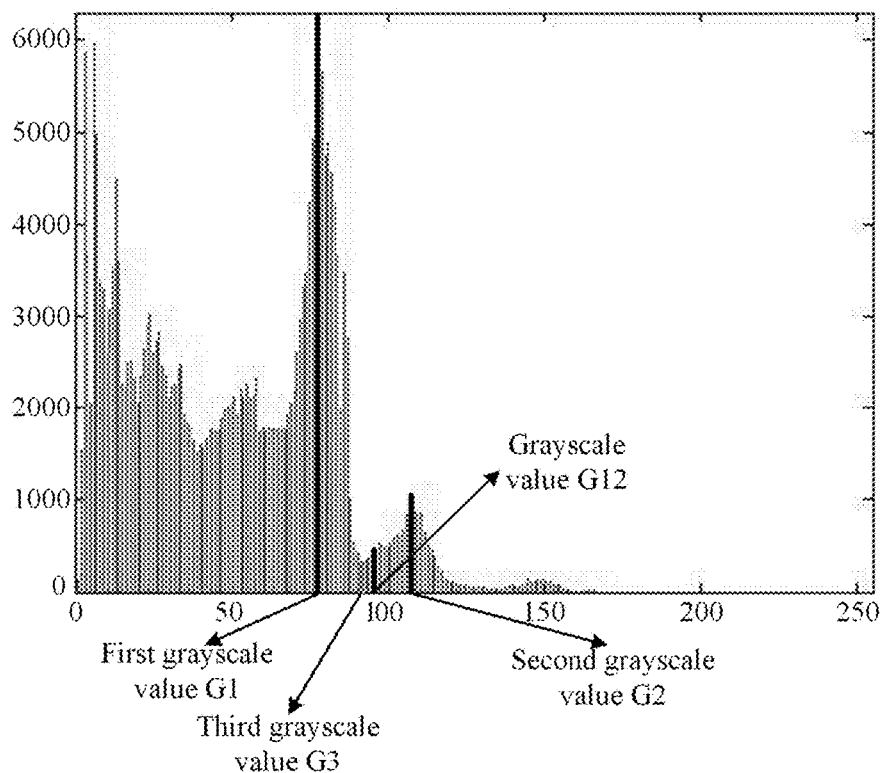
FIG. 2 is a schematic diagram of threshold segmentation in the detection and positioning method for the train water injection port according to the embodiment of the present invention.

As shown in FIG. 2, first, the pixel counting results enter a first comparator one by one. The first comparator retains large values and discards small values to finally obtain the maximum value M1 of the pixel counting results, and the address of the storage space of the dual-port RAM corresponding to the maximum value is read as the corresponding grayscale value G1. Secondly, a 5-level comparator is provided. The 5-level comparator retains small values and discards large values. The pixel counting results with grayscale values greater than G1 sequentially enter the 5-level comparator. If a count value for a certain grayscale sequentially appears in the 5-level comparator, then the value is considered to be the first valley M12 on the right side of G1. Then, the secondary peak value M2 on the right side of the corresponding grayscale value G12 is calculated by the comparator, and its corresponding grayscale value is G2. Finally, a second comparator is provided. The second comparator retains small values and discards large values. The pixel counting results between G1 and G2 sequentially enter the second comparator. The minimum value M3 is calculated, and the corresponding grayscale value is G3. G3 is defined as a binarization threshold.

The step of comparing the generated video image window with the train water injection port template image, calculating the total number of pixels with the same pixel value in the same position of the video image window and the train water injection port template image, and recording the total number as the window matching result specifically includes: m rows in the binarized video image are sequentially stored into m FIFOs; data read from the m FIFOs are shifted to the left as shift bits to corresponding m n-bit shift registers; a bitwise XNOR is performed on the read m n-bit left shift registers and m n-bit template image registers; XNOR results of each row are added up bitwise, that is, to count the number of pixels with the same pixel value in each corresponding n-bit register to obtain n row matching results; and the row matching results of the corresponding m n-bit registers are summed up, that is, to count the number of pixels with the same pixel value in the same position of the video image window and the train injection port template image as the window matching result.

Figure 3:
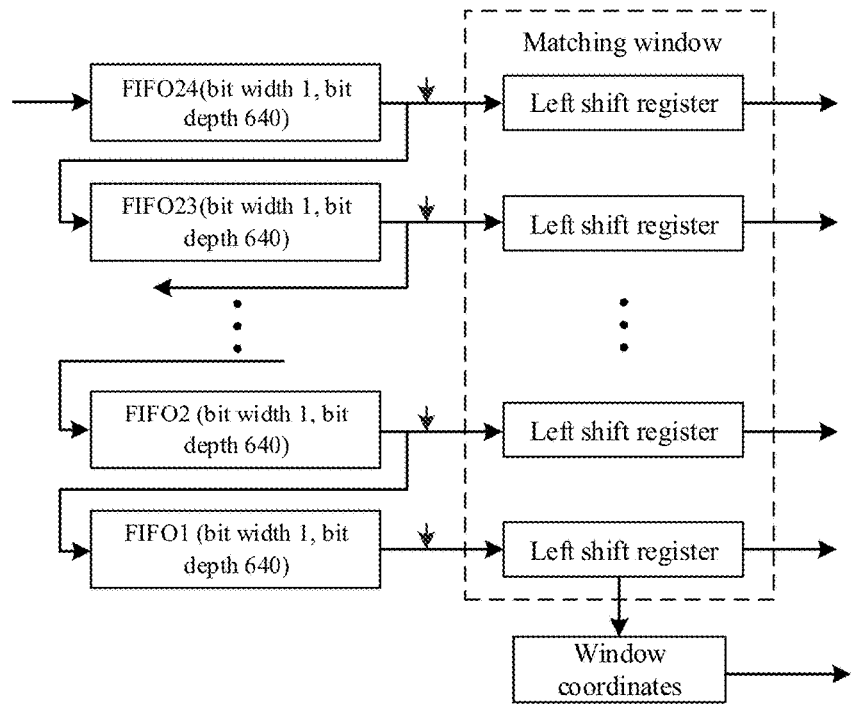
FIG. 3 is a schematic diagram of the generation of a video image window in the detection and positioning method for the train water injection port according to the embodiment of the present invention.

Specifically, as shown in FIG. 3, m FIFOs and left shift registers are provided. The number of rows of the train water injection template image is 24, and thus the value of m is 24. Each row of the binarized video image has 640 pixels, and thus the depth of the FIFO is set to 640. Since the grayscale value of each pixel has a bit width of 1, the width of the FIFO is 1. The pixels of the binarized video image first enter FIFO1, and enter FIFO2 when the FIFO1 is filled. When the 24 FIFOs are all filled, buffering of the 24 rows of the image is completed to generate a 24-row two-dimensional image matrix. 24 16-bit left shift registers are provided to correspond to the 24 FIFOs. When the 24 FIFOs are all filled, carry bits of the left shift registers are read at the same time. The 24 16-bit left shift registers form a 16×24 video image window. When the 24 FIFOs are all filled, a window column counter and a window row counter are provided. Each time the FIFO reads one piece of data, the window column counter is incremented by one to calibrate row coordinates of the first pixel of the window. When a count value of the window column counter reaches 640, the window row counter is incremented by one to calibrate the row coordinates of the first pixel of the window.

Figure 4:
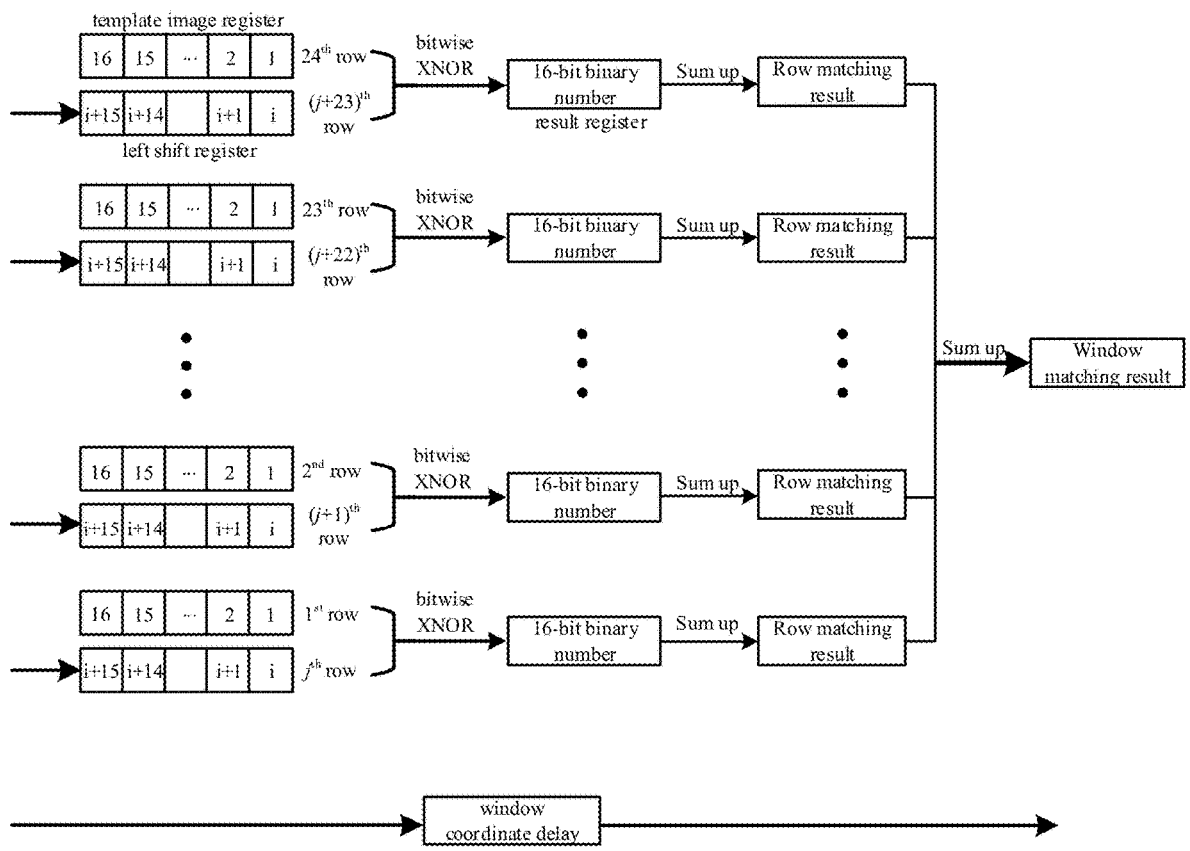
FIG. 4 is a schematic diagram of template matching in the detection and positioning method for the train water injection port according to the embodiment of the present invention.

As shown in FIG. 4, a matching result is obtained by performing a bitwise XNOR between the video image window and the train water injection port template image. The train water injection port template image is stored in 24 16-bit template image registers, which correspond to the 24 16-bit left shift registers of the video image window. A bitwise XNOR operation is performed on each pair of registers to obtain a set of 16×24 XNOR results, which are stored in 24 16-bit XNOR result registers. First, data in each XNOR result register are added up bitwise to obtain a row matching result. The sum obtained by the addition is the number of 1 in the register, i.e., the number of pixels that are successfully matched with the first row of the train water injection port template image. Then, 24 row matching results are added up to obtain a window matching result.

It is determined whether the video image window is successfully matched with the train water injection port template image, and then it is determined whether the successfully matched window is within a specified position range. A matching threshold PE is set. When the window matching result is greater than PE, the matching is successful, and then coordinates of the successfully matched window are read in from a video image window generating module. The comparator determines whether the coordinates of the successfully matched window are within the set range, that is, whether the abscissa is greater than RA and less than RB while the ordinate is greater than CA and less than CB. If the coordinates are within the range, the matching is successful and a matching valid signal is transmitted to the mechanical device. PE, RA, RB, CA, and CB are pre-set values. Generally, PE is equal to 325, RA is equal to 298, RB is equal to 318, CA is equal to 222, and CB is equal to 242.

When a train stops, the mechanical device is started and a movement time timer is started. When the matching valid signal is transmitted to the mechanical device control module, the mechanical device stops moving, the movement time timer stops timing, and a water injection gun is extended to start water injection. The water injection is stopped after 6 minutes, and the mechanical device returns to its original path according to the time counted by the movement time timer.

The method further includes: measuring light intensity in a surrounding environment in real time, and when the measured ambient illuminance is lower than a set illuminance threshold, an external lighting lamp is controlled to be turned on and off.

Specifically, when the light around the train water injection port is dim, a complementary metal-oxide-semiconductor (CMOS) camera cannot work normally. In this regard, a light detector is employed to monitor the light of the surrounding environment in real time. When the illuminance is excessively low, the light detector transmits a lighting start signal to turn on the lighting lamp.

Figure 5:
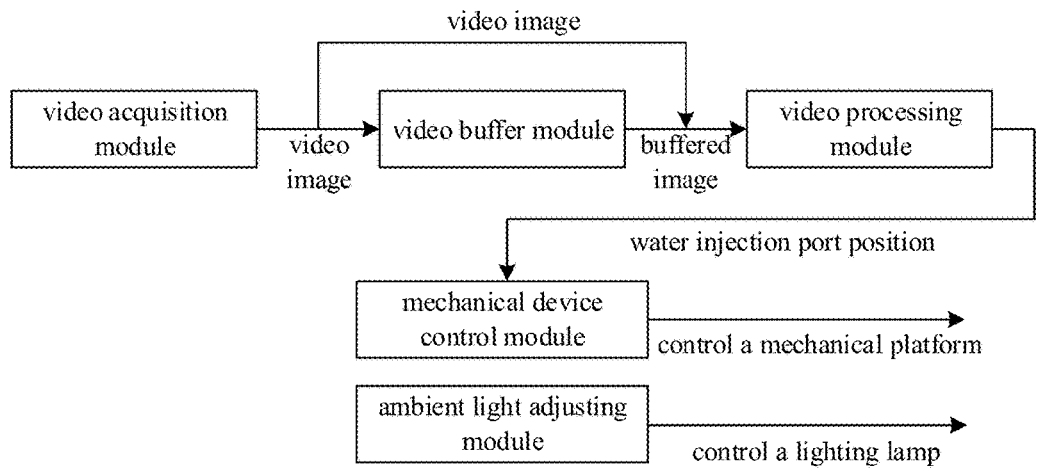
FIG. 5 is a schematic diagram of the structure of a field-programmable gate array (FPGA)-based detection and positioning system for the train water injection port according to an embodiment of the present invention.
Figure 6:
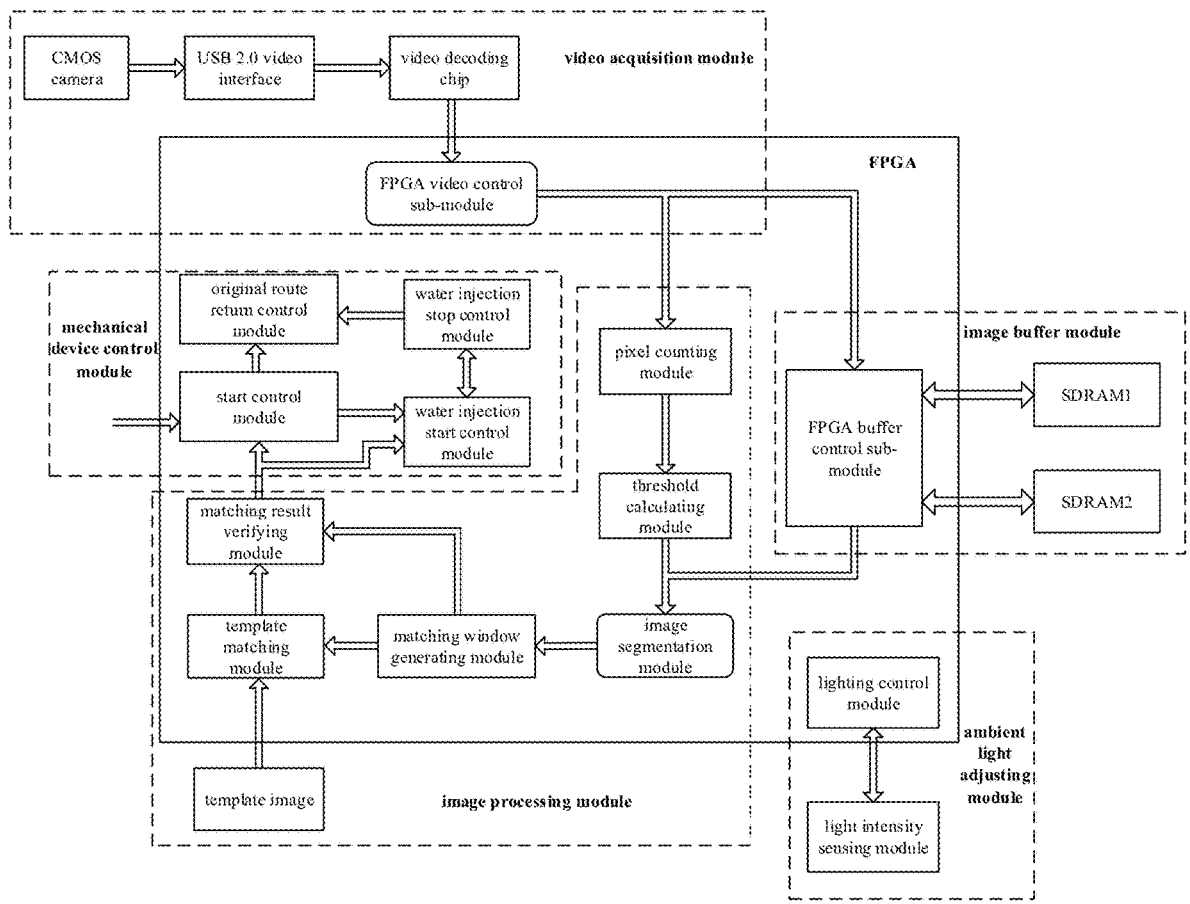
FIG. 6 is a block diagram of the structure of the FPGA-based detection and positioning system for the train water injection port according to the embodiment of the present invention.

The embodiment of the present invention further provides an FPGA-based detection and positioning system for a train water injection port. As shown in FIGS. 5-6, the system includes: the video acquisition module 1, the image buffer module 2, the image processing module 3, the mechanical device control module 4, and the ambient light adjusting module 5.

The video acquisition module 1 is configured to acquire continuous train water injection port video images, decode the train water injection port video images, and transmit the decoded train water injection video images to the image buffer module 2, the image processing module 3, and the mechanical device control module 4, respectively.

The image buffer module 2 is configured to receive the decoded train water injection port video images and buffer two frames of the train water injection port video images and all pixel position coordinate information, and transmit the buffered train water injection port video images and the pixel position coordinate information to the image processing module 3.

The image processing module 3 is configured to preprocess the acquired train water injection port video images, match the preprocessed train water injection port video images with the train water injection port template image, detect the position of the water injection port in the train water injection port video image, compare the position with a pre-set position range where the water injection port is located to determine whether the position and the pre-set position range has been matched, and transmit a matching valid signal to the mechanical device control module 4 if the position and the pre-set position range have been matched.

The mechanical device control module 4 is configured to transmit a mechanical device operating mode control signal to a receiving unit of the mechanical device to control the mechanical device to move and stop, and control the mechanical device to start or stop water injection in combination with the matching valid signal.

The ambient light adjusting module 5 is configured to detect light intensity in the surrounding environment, and control the lighting lamp to be turned on and off, and adjust the brightness of the environment in real time.

The video acquisition module 1 includes the CMOS camera 11, the USB 2.0 video interface 12, the video decoding chip 13, and the FPGA video control sub-module 14.

The CMOS camera 11 is configured to acquire the train water injection port video image with a resolution of M×N pixels and a frame rate off wherein a grayscale value of each pixel acquired is one piece of 8-bit integer data, and transmit the acquired data to the USB 2.0 video interface 12 through a USB data line.

The USB 2.0 video interface 12 is configured to receive the train water injection port video images acquired by the CMOS camera 11, and transmit the train water injection port video images to the video decoding chip 13 by means of differential transmission.

The video decoding chip 13 is configured to re-encode the train water injection video image transmitted from the USB 2.0 video interface 12 into 8-bit pixel signals, line synchronization signals and frame synchronization signals, designate these 10-bit signals as the decoded video image, and then transmit the decoded video image in parallel to the FPGA video control sub-module 14.

The FPGA video control sub-module 14 is configured to receive the decoded video image transmitted from the video decoding chip 13, calibrate pixel position coordinate information for each pixel according to the line synchronization signal and the frame synchronization signal, and transmit the decoded video image to the image buffer module 2 and the image processing module 3, and transmit the first row of pixels in the decoded video image to the mechanical device control module 4.

The image buffer module 2 includes the FPGA buffer control sub-module 21 and the synchronous dynamic RAM (SDRAM) memory 22, wherein the SDRAM memory includes SDRAM1 and SDRAM2.

The FPGA buffer control sub-module 21 is configured to receive the decoded video image transmitted from the video acquisition module 1 and write the decoded video image into one SDRAM, read the decoded video image in the other SDRAM, and transmit the decoded video image to the image processing module 3.

The SDRAM memory 22 includes two SDRAMs. Each SDRAM is configured to store one frame of the decoded video image, and the module reads in the decoded video image from the FPGA buffer control sub-module 21, and stores the decoded video image in memory cells of one SDRAM, wherein each memory cell stores one pixel.

The image processing module 3 includes: the pixel counting module 31, the threshold calculating module 32, the image segmentation module 33, the video image window generating module 34, the template matching module 35, and the matching result verifying module 36.

The pixel counting module 31 is configured to receive the decoded video image from the FPGA video acquisition module 1, count the number of pixels corresponding to each grayscale value in the current frame image to form an abstract grayscale histogram, and output a pixel counting result of each frame of the image to the threshold calculating module 32 during a frame blanking period.

The threshold calculating module 32 is configured to receive the pixel counting result transmitted from the pixel counting module 31, calculate a binarization threshold with an optimal segmentation effect according to the abstract gray histogram, and transmit the binarization threshold to the image segmentation module 33.

The image segmentation module 33 is configured to perform threshold segmentation on the decoded video image, sequentially read in the decoded video images pixel by pixel, perform binarization segmentation by using the binarization threshold, and then sequentially transmit the binarized video images to the video image window generating module 34 pixel by pixel.

The video image window generating module 34 is configured to sequentially generate an m×n video image window according to a step of 1 by using the binarized video images and transmit the video image window to the template matching module 35, mark the position of a pixel in the first row and the first column of the video image window in the entire frame of the image as position coordinates $P(i,j)$ of the video image window, and transmit $P(i,j)$ to the matching result verifying module 36, wherein m is the number of rows of the train water injection port template image, n is the number of columns of the train water injection port template image, i is a row coordinate of the video image window, and j is a column coordinate of the video image window.

The template matching module 35 is configured to compare the generated video image window with the train water injection port template image, calculate the total number of pixels with the same pixel value in the same position of the video image window and the train water injection port template image, record the total number as a window matching result, and transmit the window matching result to the matching result verifying module 36.

The matching result verifying module 36 is configured to perform matching degree verification and window matching position verification on the window matching result to obtain a matching valid signal, and transmit the matching valid signal to the mechanical device control module 4.

The mechanical device control module 4 includes: the start control module 41, the water injection start control module 42, the water injection stop control module 43, and the original route return control module 44.

The start control module 41 is configured to receive a moving start signal transmitted from a start switch and transmit a moving command to the mechanical device through a serial port while timing the movement time, and when receiving the matching valid signal transmitted from the matching result verifying module 36, transmit a stop command to the mechanical device through the serial port while ending timing the movement time.

The water injection start control module 42 is configured to receive the matching valid signal and control the mechanical device to start water injection.

The water injection stop control module 43 is configured to time the water injection time, and when the time reaches 6 minutes, control the mechanical device to stop water injection and transmit a water injection end signal to the original route return control module 44.

The original route return control module 44 is configured to receive the water injection end signal, read a timing value of the movement time of the start control module 41, and control the mechanical device to reversely move to the starting position according to the timing value of the movement time.

The ambient light adjusting module 5 includes: the light intensity sensing module 51 and the lighting control module 52.

The light intensity sensing module 51 is configured to measure the light intensity in the surrounding environment in real time, and when the measured ambient illuminance is lower than a set illuminance threshold, transmit a lighting start signal to the lighting control module 52.

The lighting control module 52 is configured to receive the lighting start signal transmitted from the light intensity sensing module 51, and then control the external lighting lamp to be turned on and off.

The FPGA buffer control sub-module 21 includes the pixel stream receiving unit 21a, the read-write control unit 21b, and the pixel stream transmitting unit 21c.

The pixel stream receiving unit 21a is configured to read the decoded video image from the video acquisition module 1, count the video frames according to the frame synchronization signal, and transmit a frame count value to the read-write control unit 21b.

The read-write control unit 21b is configured to receive the frame count value and control the read and write of SDRAM: if the frame count value is 2a, then write it into SDRAM1 while reading the image of the $(2a-1)^{th}$ frame from SDRAM2, and if the frame count value is 2a+1, then write it into SDRAM2 while reading the image of the $(2a)^{th}$ frame from SDRAM1, wherein a=0, 1, 2, . . . , and repeatedly read and write in this way.

The pixel stream transmitting unit 21c is configured to transmit the decoded video image read from the SDRAM to the image processing module 3, and count the pixels in the decoded video image to generate pixel position coordinate information, buffered line synchronization signals and buffered frame synchronization signals while transmitting the pixel position coordinate information, the buffered line synchronization signals and the buffered frame synchronization signals to the image processing module 3.

The pixel counting module 31 includes the dual-port RAM 31a, the buffer register 31b, and the add-one adder 31c.

The dual-port RAM 31a is configured to store the pixel counting results with a bit depth of 256 and a bit width of 16, use the grayscale value of the decoded video image transmitted from the FPGA video acquisition module 1 as an address of the storage space to read data stored in the corresponding address through port A of the dual-port RAM, use the data buffered by the buffer register 31b as an address to write the result calculated by the add-one adder 31c into the storage space of the corresponding address through port B of the dual-port RAM, and after the counting of the full frame is completed, read all the stored data from small to large by grayscale value to the threshold calculating module 32 through port B of the dual-port RAM.

The buffer register 31b is configured to buffer each pixel of the decoded video image by a clock cycle, in the same clock cycle, use the pixel grayscale value before buffering as an address of port A of the dual-port RAM 31a to read the data in the address to the add-one adder 31c, and use the buffered pixel grayscale value as an address of port B of the dual-port RAM 31a to write the data output by the add-one adder.

The add-one adder 31c is configured to perform an add-one operation on the data read from port A of the dual-port RAM 31a, and then store the calculation result to the same memory cell through port B of the dual-port RAM at the same address.

The threshold segmentation module 32 includes the highest peak calculating module 32a, the secondary peak calculating module 32b, and the minimum value calculating module 32c.

The highest peak calculating module 32a is configured to calculate the maximum value M1 in the abstract grayscale histogram, and transmit the calculated M1 and its corresponding grayscale value G1 to the secondary peak calculating module 32b and the minimum value calculating module 32c.

The secondary peak calculating module 32b is configured to calculate the secondary peak value M2 on the right side of G1 in the histogram, and transmit M2 and its corresponding grayscale value G2 to the minimum value calculating module 32c.

The minimum value calculating module 32c is configured to calculate the histogram between G1 and G2 to obtain the valley minimum value M3 and its corresponding grayscale value G3, and define G3 as the binarization threshold.

The video image window generating module 34 includes the FIFO buffer module 34a, the window register group 34b, and the window position calibrating module 34c.

The FIFO buffer module 34a is configured to receive the binarized video image transmitted from the image segmentation module 33, and sequentially store m rows of the binarized video image in m FIFOs, and when all the FIFOs are full, read each FIFO to the window register group 34b, wherein m is the number of rows of the train water injection port template image.

The window register group 34b is configured to register the data read from the FIFOs, shift the data read from the m FIFOs to the left as shift bits to corresponding m n-bit shift registers, and read the data in the m n-bit shift registers to the template matching module 35, wherein n is the number of columns of the train water injection port template image.

The window position calibrating module 34c is configured to receive the pixel position coordinate information in the image buffer module 2, and assign the pixel position coordinate information corresponding to the pixel in the first row and the first column of the video image window to the position coordinates P(i,j) of the video image window, and transmit P(i,j) to the template matching module 35, wherein i is a row coordinate of the video image window, and j is a column coordinate of the video image window.

The template matching module 35 includes the template storage register group 35a, the XNOR gate array 35b, the matching row adder group 35c, and the video image window adder group 35d.

The template storage register group 35a is configured to store the train water injection port template image into m n-bit template registers, and transmit the data stored therein to the XNOR gate array 35b, wherein m is the number of rows of the train water injection port template image, and n is the number of columns of the train water injection port template image.

The XNOR gate array 35b is configured to perform a bitwise XNOR on the read m n-bit shift registers and m n-bit template registers, and transmit the XNOR results to the matching row adder group 35c.

The matching row adder group 35c is configured to add up the XNOR results of each row, count the number of pixels with the same pixel value in each corresponding n-bit register to obtain a row matching result, and transmit the row matching result to the video image window adder group 35d.

The video image window adder group 35d is configured to sum up the row matching results of the corresponding m n-bit registers to count the number of pixels with the same pixel value in the same position of the video image window and the train injection port template image as the window matching result, and transmit the window matching result to the matching result verifying module 36.

The matching result verifying module 36 includes the pixel number matching module 36a and the position matching module 36b.

The pixel number matching module 36a is configured to verify the window matching result transmitted from the template matching module 35, and compare the window matching result with a set matching threshold: if the window matching result is greater than the matching threshold, then perform pixel number matching, and then perform position matching; and if the window matching result is less than the matching threshold, then wait for the arrival of the next clock window matching result, and continue to perform the pixel number matching.

The position matching module 36b is configured to verify the position of the video image window successful in the pixel number matching, read the position coordinates P(i,j) of the video image window from the window position calibrating module 34c, and compare the position matching results P(i,j) and a set window position range: if P(i,j) is within the set window position range, then determine the position matching as successful, and transmit the matching valid signal to the mechanical device control module 4; and if P(i,j) is not within the set window position range, then wait for the next verification.

The above descriptions are only the preferred embodiments of the present invention, and are not used to limit the scope of protection of the present invention.

What is claimed is:

1. A detection and positioning method for a train water injection port, comprising:
    acquiring continuous train water injection port video images, and performing a threshold segmentation on the continuous train water injection port video images to obtain binarized train water injection port video images;
    processing the binarized train water injection port video images and matching the processed binarized train water injection port video images with a train water injection port template image;
    detecting a position of the water injection port in the processed binarized train water injection port video images and comparing the position with a pre-set position range, wherein the water injection port is located in the pre-set position range; and
    if the position and the pre-set position range have been matched, then transmitting a matching valid signal to a mechanical device control module to control a mechanical device to move or stop and start or stop water injection.

2. The detection and positioning method for the train water injection port according to claim 1, wherein
    the step of performing the threshold segmentation on the train water injection port video images to obtain the binarized train water injection port video images specifically comprises:
    performing a binarization segmentation on the continuous train water injection port video images according to a binarization threshold, and sequentially generating an m×n video image window pixel by pixel according to a step of 1 by using the binarized train water injection port video images.

3. The detection and positioning method for the train water injection port according to claim 2, wherein
    in a position of the m×n video image window, a position of a pixel in a first row and a first column in an entire frame image in the m×n video image window is marked as coordinates P(i,j) of the position of the m×n video image window.

4. The detection and positioning method for the train water injection port according to claim 3, wherein
    a process of obtaining the binarization threshold specifically comprises:
    counting a number of pixels corresponding to each grayscale value in a current frame image in the binarized train water injection port video images to form an abstract grayscale histogram, and calculating a binarization threshold with an optimal segmentation effect according to the abstract grayscale histogram.

5. The detection and positioning method for the train water injection port according to claim 4, further comprising:
    determining a maximum value and a first grayscale value corresponding to the maximum value in the abstract grayscale histogram, determining a secondary peak value on a right side of the first grayscale value and a second grayscale value corresponding to the secondary peak value in the abstract grayscale histogram, calculating a histogram between the first grayscale value and the second grayscale value to obtain a minimum valley value and a third gray scale value corresponding to the minimum valley value, and defining the third grayscale value as the binarization threshold.

6. The detection and positioning method for the train water injection port according to claim 5, wherein
    the step of comparing the position with the pre-set position range, wherein the water injection port is located in the pre-set position range, and if the position and the pre-set position range have been matched, then transmitting the matching valid signal to the mechanical device control module to control the mechanical device to move or stop and start or stop the water injection specifically comprises:
    comparing the m×n video image window with the train water injection port template image, calculating a total number of pixels with the same pixel value in the same position of the m×n video image window and the train water injection port template image, recording the total number as a window matching result, performing a matching degree verification on the window matching result and performing a window matching position verification on the window matching result in combination with the position P(i,j) of the m×n video image window to obtain a matching valid signal, and transmitting the matching valid signal to the mechanical device control module.

7. The detection and positioning method for the train water injection port according to claim 6, wherein
the step of comparing the m×n video image window with the train water injection port template image, calculating the total number of the pixels with the same pixel value in the same position of the m×n video image window and the train water injection port template image, and recording the total number as the window matching result specifically comprises:
sequentially storing m rows in the binarized train water injection port video image into m FIFOs;
shifting data read from the m FIFOs to left as shift bits to m n-bit shift registers;
performing a bitwise XNOR on the m n-bit shift registers and m n-bit template registers;
adding up XNOR results of each row;
counting a number of pixels with the same pixel value in each corresponding n-bit register to obtain n row matching results; and
summing up the n row matching results of the corresponding m n-bit registers to count the number of the pixels with the same pixel value in the same position of the m×n video image window and the train injection port template image as the window matching result.

8. The detection and positioning method for the train water injection port according to claim 7, further comprising:
verifying the window matching result, and comparing the window matching result with a set matching threshold as follows: if the window matching result is greater than the set matching threshold, then performing pixel number matching, and then performing position matching, and if the window matching result is less than the set matching threshold, then waiting for an arrival of a next clock window matching result and continuing to perform the pixel number matching.

9. The detection and positioning method for the train water injection port according to claim 8, further comprising:
performing position verification on the m×n video image window successful in the pixel number matching, and comparing a position matching result P(i,j) with a set window position range as follows: if the position matching result P(i,j) is within the set window position range, then determining the position matching as successful, and transmitting the matching valid signal to the mechanical device control module, and if the position matching result P(i,j) is not within the set window position range, then waiting for next verification.

10. The detection and positioning method for the train water injection port according to claim 2, further comprising:
measuring light intensity in a surrounding environment in real time to obtain a measured ambient illuminance, and when the measured ambient illuminance is lower than a set illuminance threshold, controlling an external lighting lamp to be turned on and off.

11. The detection and positioning method for the train water injection port according to claim 3, further comprising:
measuring light intensity in a surrounding environment in real time to obtain a measured ambient illuminance, and when the measured ambient illuminance is lower than a set illuminance threshold, controlling an external lighting lamp to be turned on and off.

12. The detection and positioning method for the train water injection port according to claim 4, further comprising:
measuring light intensity in a surrounding environment in real time to obtain a measured ambient illuminance, and when the measured ambient illuminance is lower than a set illuminance threshold, controlling an external lighting lamp to be turned on and off.

13. The detection and positioning method for the train water injection port according to claim 5, further comprising:
measuring light intensity in a surrounding environment in real time to obtain a measured ambient illuminance, and when the measured ambient illuminance is lower than a set illuminance threshold, controlling an external lighting lamp to be turned on and off.

14. The detection and positioning method for the train water injection port according to claim 6, further comprising:
measuring light intensity in a surrounding environment in real time to obtain a measured ambient illuminance, and when the measured ambient illuminance is lower than a set illuminance threshold, controlling an external lighting lamp to be turned on and off.

15. The detection and positioning method for the train water injection port according to claim 7, further comprising:
measuring light intensity in a surrounding environment in real time to obtain a measured ambient illuminance, and when the measured ambient illuminance is lower than a set illuminance threshold, controlling an external lighting lamp to be turned on and off.

16. The detection and positioning method for the train water injection port according to claim 8, further comprising:
measuring light intensity in a surrounding environment in real time to obtain a measured ambient illuminance, and when the measured ambient illuminance is lower than a set illuminance threshold, controlling an external lighting lamp to be turned on and off.

17. The detection and positioning method for the train water injection port according to claim 9, further comprising:
measuring light intensity in a surrounding environment in real time to obtain a measured ambient illuminance, and when the measured ambient illuminance is lower than a set illuminance threshold, controlling an external lighting lamp to be turned on and off.

18. The detection and positioning method for the train water injection port according to claim 1, further comprising:
measuring light intensity in a surrounding environment in real time to obtain a measured ambient illuminance, and when the measured ambient illuminance is lower than a set illuminance threshold, controlling an external lighting lamp to be turned on and off.

\* \* \* \* \*